United States Patent
Croxford (10) Patent No.: US 8,213,461 B2
(45) Date of Patent: Jul. 3, 2012

(54) METHOD OF DESIGNATING SLOTS IN A TRANSMISSION FRAME FOR CONTROLLING TRANSMISSION OF DATA OVER AN INTERCONNECT COUPLING A PLURALITY OF MASTER UNITS WITH A PLURALITY OF SLAVE UNITS

(75) Inventor: Daren Croxford, Cambridgeshire (GB)

(73) Assignee: ARM Limited, Cambridge (GB)

( * ) Notice: Subject to any disclaimer, the term of this patent is extended or adjusted under 35 U.S.C. 154(b) by 1490 days.

(21) Appl. No.: 11/391,687

(22) Filed: Mar. 29, 2006

(65) Prior Publication Data

US 2007/0239888 A1 Oct. 11, 2007

(51) Int. Cl.
*H04J 3/16* (2006.01)

(52) U.S. Cl. ........................................ 370/498; 710/110

(58) Field of Classification Search .................. 370/294, 370/310, 314, 345, 376, 395.1, 395.4, 395.42, 370/431, 433, 437, 4, 58, 473, 498; 710/6, 710/22, 25, 29, 30, 40, 45, 58, 61, 100, 107, 710/110, 117, 111, 114, 124

See application file for complete search history.

(56) References Cited

U.S. PATENT DOCUMENTS

| | | | | |
|---|---|---|---|---|
| 4,969,120 A * | 11/1990 | Azevedo et al. | ............... | 710/117 |
| 6,397,280 B1 * | 5/2002 | Nitschke et al. | ............... | 710/110 |
| 6,446,151 B1 * | 9/2002 | Fischer et al. | ................ | 710/124 |
| 6,513,089 B1 * | 1/2003 | Hofmann et al. | ............. | 710/309 |
| 6,678,774 B2 * | 1/2004 | Providenza | .................... | 710/240 |
| 6,813,673 B2 * | 11/2004 | Kotlowski et al. | ............ | 710/305 |
| 7,120,714 B2 * | 10/2006 | O'Connor et al. | ............ | 710/243 |
| 7,145,903 B2 * | 12/2006 | Gutierrez | ....................... | 370/362 |
| 7,165,133 B2 * | 1/2007 | Takeuchi et al. | .............. | 710/110 |
| 7,287,110 B2 * | 10/2007 | Herz et al. | ..................... | 710/107 |
| 7,397,774 B1 * | 7/2008 | Holland et al. | ................ | 370/326 |
| 2003/0043680 A1 * | 3/2003 | Akiba et al. | ................... | 365/227 |
| 2004/0153591 A1 * | 8/2004 | Tanaka et al. | ................. | 710/107 |
| 2005/0177663 A1 * | 8/2005 | Jeong | ............................ | 710/110 |

* cited by examiner

*Primary Examiner* — Chi Pham
*Assistant Examiner* — Curtis A Alia
(74) *Attorney, Agent, or Firm* — Nixon & Vanderhye, PC (57) ABSTRACT

A transmission frame for controlling data transmission includes a plurality of slots, each slot used for the transmission of data over an interconnect that couples master units to slave units. Slots in the transmission frame are in three groups: (a) a first group in which slots are each allocated to one predetermined master unit for data transmission with any slave unit; (b) a second group of slots each being allocatable to any master unit for data transmission with any slave unit; and (c) a third group of slots each allocated to a predetermined one of the master units and slave units. Where a slot of the third group is not needed by the allocated master unit or slave unit, the slot can then be reallocated to another master unit. Hence, more slots can be used and the efficiency of data transfers over the interconnect can be improved.

15 Claims, 7 Drawing Sheets

| ARRANGEMENT 0 | BE | BE | BE | BE | BE | BE | BE | BE | BE | HK |
|---|---|---|---|---|---|---|---|---|---|---|

| ARRANGEMENT 1 | L2 | BE | BE | BE | BE | L2 | BE | BE | BE | HK |
|---|---|---|---|---|---|---|---|---|---|---|

| ARRANGEMENT 2 | L2 | GT 1 | BE | LT 1 | BE | L2 | GT 1 | BE | GT 1 | HK |
|---|---|---|---|---|---|---|---|---|---|---|

| ARRANGEMENT 3 | L2 | GT 1 | GT 0 | GT 1 | BE | L2 | GT 1 | GT 0 | GT 1 | HK |
|---|---|---|---|---|---|---|---|---|---|---|

METHOD OF DESIGNATING SLOTS IN A TRANSMISSION FRAME FOR CONTROLLING TRANSMISSION OF DATA OVER AN INTERCONNECT COUPLING A PLURALITY OF MASTER UNITS WITH A PLURALITY OF SLAVE UNITS

FIELD OF THE INVENTION

The present invention relates to techniques for controlling transmission of data. Embodiments of the present invention relates to techniques within a system-on-a-chip environment for controlling transmission of data over an interconnect coupling a plurality of master units with a plurality of slave units.

BACKGROUND OF THE INVENTION

Interconnects for use in a system-on-a-chip environment are known. Typically, these interconnects are used to couple one or more master units with one or more slave units. When data is to be transmitted between a master unit and a slave unit, a transmission request is typically received and the interconnect may be configured to couple the two units together. Once coupled, data transmission can then occur. Many such transmission requests may be received to transmit data between master units and slave units over the interconnect.

The connectivity within the interconnect is typically limited such that only a predetermined number of masters may be coupled with a predetermined number of slaves at any one time. Accordingly, it will be appreciated that this provides a finite limit on the throughput of the interconnect which can restrict the ability of the interconnect to respond to each transmission request.

Typically, each transmission request will have some quality of service requirement associated therewith, either provided with the transmission request or derivable from that transmission request. Techniques exist which analyse each transmission request, review any pending transmission requests and re-order those transmission requests seeks to ensure that as many of the requests as possible are satisfied having regard to any quality of service requirements associated with those transmission requests.

However, it is often difficult to service every transmission request. Accordingly, it is desired to provide an improved technique for controlling data transmission over an interconnect.

SUMMARY OF THE INVENTION

According to a first aspect, the present invention provides a method of designating slots of a transmission frame, the transmission frame comprising a plurality of the slots, each of the plurality of slots being utilisable for the transmission of data in a system-on-a-chip over an interconnect coupling a plurality of master units with a plurality of slave units, the method comprising the steps of: a) designating a first group of slots of the transmission frame, each of the first group of slots being allocated to one predetermined master unit for data transmission with any of the plurality of slave units; b) designating a second group of slots of the transmission frame, each of the second group of slots being allocatable to any master unit for data transmission with any of the plurality of slave units; and c) designating a third group of slots of the transmission frame, each slot of the third group of slots being allocated to a predetermined one of the plurality of master units and the plurality of slave units and being reallocatable to one of the plurality of master units.

The present invention recognises that typically, when seeking to utilise a resource such as an interconnect, it is useful to provide transmission slots which are then allocated for the transmission of data over that interconnect. The present invention also recognises that it may be desirable, having regard to the likely quantity and quality of service requirements of transmission requests to pre-allocate such slots to form a transmission frame, which is repeated. However, the present invention also recognises that the pre-allocation of slots within a transmission frame may lead to the inefficient use of the interconnect.

Accordingly, within each transmission frame each slot is allocated as belonging to one of three different groups. Slots belonging to the first group are allocated for the use of a designated one of the plurality of master units. Hence, each master unit which has such a slot designated in each frame can be certain that at least once during a frame it will have the ability to transmit data over the interconnect. Slots belonging to the second group are available to any master unit for data transmission with any of the of slave units. Hence, slots are provided in each frame to meet any additional demand from master units to transmit data over the interconnect. Slots belonging to the third group are available for use by master units or slave units, but these slots are also re-allocatable to other master units for their use. Accordingly, it will be appreciated that should a slot of the third group not need to be used by the allocated unit, this slot can then be reassigned for use by another master unit. In this way, more use of the slots can be achieved and the efficiency of data transfers over the interconnect can be improved.

For example, consider the situation where a particular unit generally requires regular control of the interconnect for a short period of time. One solution may be to allocate a first group slot for use by that unit. However, in a complex arrangement, allocating slots to the first group significantly reduces the flexibility of the use of the interconnect and may be undesirable. Another solution may have been to rely on being allocated use of a slot belonging to the second group. However, allocation of such a slot to the unit cannot be guaranteed. By providing the third group of slots, one of the slots in the third group can be allocated to that unit. Hence, should the unit require access to the interconnect then it may do so. Should it not require access to the interconnect then the slot may be reallocated to another unit. Also, should the unit require access to the interconnect for only a short period then it may do so. Thereafter, the slot may be reallocated to another unit. In this way it can be seen that a unit can be guaranteed to be provided with regular control of the interconnect, even for a short period of time, without reducing the efficiency of the interconnect.

In one embodiment, each slot of the third group of slots is reallocatable to one of the plurality of master units once no longer required by the one of the plurality of master units and the plurality of slave units.

Consider the situation where a particular unit generally requires regular control of the interconnect, but only for a short period of time. One solution may have been to allocate a slot from the first group for use by that unit. However, in a complex arrangement, allocating slots to the first group significantly reduces the flexibility of the use of the interconnect and may be undesirable. Another solution may have been to rely on being allocated use of a slot belonging to the second group. However, allocation of such a slot to the unit cannot be guaranteed. By providing the third group of slots, one of the slots in the third group can be allocated to that unit. Hence, should the unit require access to the interconnect then it may do so. Should it not require access to the interconnect then the slot may be reallocated to another unit. Also, should the unit require access to the interconnect for only a short period then it may do so. Thereafter, the slot may be reallocated to another unit. In this way it can be seen that a unit can be guaranteed to be provided with regular control of the interconnect, even for a short period of time, without reducing the efficiency of the interconnect.

In one embodiment, at least one slot of the third group of slots is allocated for transmission of data between a predetermined one of the master units and any of the plurality of slave units and, once the transmission of data has been completed, any remainder of that slot is reallocatable for transmission of data between any of the plurality of master units and any of the plurality of slave units.

Accordingly, once a master unit to which the slot has been allocated has completed its required data transmission, the slot may then be reallocated for use by another master unit.

In one embodiment, the transmission of data between the predetermined one of the master units and the any of the plurality of slave units comprises a burst transmission of one or more of data values and, once the burst transmission has been completed, any remainder of that slot is reallocatable for transmission of data between any of the plurality of master units and any of the plurality of slave units.

In one embodiment, at least one slot the third group of slots is allocated for preventing data transmission with a slave unit to enable that slave unit to perform an operation and, once the operation has been completed, any remainder of that slot is reallocatable for transmission of data between any of the plurality of master units and any of the plurality of slave units.

Accordingly, the slot may be allocated to a slave unit to enable that slave unit to perform an operation and once the slave unit has finished that operation the slot may then be reallocated to a master unit.

In one embodiment, the operation causes the slave unit to be unable to perform data transmission until the operation completes.

By allocating a slot for use by the slave unit prevents the slave unit from being requested to perform any data communication at a time at which it is unable to perform such communication.

In one embodiment, the operation occurs periodically.

The periodic occurrence of such slots allocated to a slave unit can be made to coincide with the periodic inability of that slave unit to communicate.

In one embodiment, the slave unit comprises a SDRAM and the operation comprises a refresh operation of data values stored therein.

It will be appreciated that such SDRAMs require regular refresh of data values stored therein and it is undesirable to request such a SDRAM to perform data communications during such refreshes.

In one embodiment, at least one slot of the third group of slots is allocated for transmission of data between a predetermined one of the master units and any of the plurality of slave units and, once the transmission of data has been completed, any remainder of that slot is reallocatable for transmission of data between any of the plurality of master units and any of the plurality of slave units and at least one slot the third group of slots is allocated for preventing data transmission with a slave unit to enable that slave unit to perform an operation and, once the operation has been completed, any remainder of that slot is reallocatable for transmission of data between any of the plurality of master units and any of the plurality of slave units.

In one embodiment, the third group of slots comprises those slots of the transmission frame which are not designated as the first group of slots or the second group of slots.

In one embodiment, each slot comprises a plurality of cycles, each cycle supporting transmission of a data value between a master unit and a slave unit.

Accordingly, each slot may support the transmission of a plurality of data values. Hence, a portion of the slot may be used for data transmission or the prevention of data transmission during a first period of the slot and the remaining portion of the slot may be used for one or more different data transmissions during a second period of that slot.

In one embodiment, the method comprises the steps of: prior steps a) to c), determining characteristics of the interconnect, the plurality of master units and the plurality of slave units and determining operating requirements of the data transmission over the interconnect coupling the plurality of master units and the plurality of slave units; and following steps a) to c), determining whether the designation of the first group of slots, the second group of slots and the third group of slots, enable the operating requirements to be met with the interconnect, the plurality of master units and the plurality of slave units having those characteristics and, if not, re-executing steps a) to c) until the requirements are met.

Hence, the allocation of the groups of slots in the frame may be predetermined having regard to the particular characteristics of the master units, the slave units and the interconnect and also any operating requirements, such as particular quality of service requirements, placed on data transmissions over the interconnect.

According to a second aspect of the present invention there is provided a computer program operable, when executed on a computer, to perform a method of designating slots of a transmission frame, the transmission frame comprising a plurality of the slots, each of the plurality of slots being utilisable for the transmission of data in a system-on-a-chip over an interconnect coupling a plurality of master units with a plurality of slave units, the method comprising the steps of: a) designating a first group of slots of the transmission frame, each of the first group of slots being allocated to one predetermined master unit for data transmission with any of the plurality of slave units; b) designating a second group of slots of the transmission frame, each of the second group of slots being allocatable to any master unit for data transmission with any of the plurality of slave units; and c) designating a third group of slots of the transmission frame, each slot of the third group of slots being allocated to a predetermined one of the plurality of master units and the plurality of slave units and being reallocatable to one of the plurality of master units.

In embodiments, the computer program is operable to perform the method steps according to the embodiments of the first aspect of the present invention.

According to a third aspect of the present invention, there is provided a method of assigning data for transmission in slots of a transmission frame, the transmission frame comprising a plurality of the slots, each of the plurality of slots being utilisable for the transmission of data in a system-on-a-chip over an interconnect coupling a plurality of master units with a plurality of slave units in response to transmission requests, each slot being designated as belonging to one of a number of different groups of slots, each group of slots allocating a different use of that slot, the method comprising the steps of: a) determining to which group each slot belongs; b) in the event that the slot belongs to a group of slots designated as being allocated to a predetermined one of the plurality of master units and the plurality of slave units and being reallocatable to one of the plurality of master units, allocating the slot to the predetermined one of the plurality of master units and the plurality of slave units; c) determining whether the slot is no longer required by the predetermined one of the plurality of master units and the plurality of slave units and, if so, reallocating the slot to one of the plurality of master units.

Accordingly, as a slot becomes available for use for transmission of data over the interconnect, a determination is made of whether that slot belongs to a predetermined group which allows for reallocation of the slot for a different use. Should it be determined that the slot is such a slot then the slot is firstly allocated for its intended use and, thereafter, should the slot no longer be required for that use it may be reallocated for another use. In this way, it will be appreciated that it is possible to provide a sequence of slots within a frame which enable particular requirements placed on the interconnect to be achieved, but also enables more efficient use of those slots once the requirement for allocation of that slot has been satisfied.

Consider the above-mentioned situation where a particular unit generally requires regular control of the interconnect, but only for a short period of time. Should that unit which was allocated the slot require access to the interconnect then it may do so. However, should it not require access to the interconnect then the slot may be reallocated to another unit. Also, should the unit require access to the interconnect for only a short period then it may do so. Thereafter, the slot may be reallocated to another unit. In this way it can be seen that a unit can be guaranteed to be provided with regular control of the interconnect, even for a short period of time, without reducing the efficiency of the interconnect.

In embodiments, the step c) comprises determining from pending transmission requests that no transmission of data between the predetermined one of the master units and the any of the plurality of slave units is required and reallocating any remainder of that slot for transmission of data between one of the plurality of master units and any of the plurality of slave units based on the pending transmission requests.

Accordingly, in the event that it is determined that a master unit which has been allocated that slot for transmission no longer requires that slot because no further transmission is required then the remainder of that slot may be allocated for transmission by another master unit based on any transmission requests that remain pending. Being able to reallocate a slot enables more efficient use of interconnect resources and enable, for example, urgent transmission requests to be serviced earlier than may otherwise have occurred.

In one embodiment, the step c) comprises reallocating any remainder of that slot for transmission of data between one of the plurality of master units and any of the plurality of slave units.

In one embodiment, the step c) comprises reallocating any remainder of that slot for transmission of data between one of the plurality of master units and one of the plurality of slave units.

In one embodiment, step c) comprises reallocating any remainder of that slot for transmission of a burst of data values between one of the plurality of master units and one of the plurality of slave units.

Accordingly, the transmission request may relate to a burst or sequence of data values to be transmitted.

In one embodiment, each data transaction request has a quality of service requirement associated therewith the step c) comprises reallocating any remainder of that slot for transmission of data associated with pending data transaction requests ordered to enable the quality of service requirements of pending transactions to be achieved.

Hence, the transaction request which is allocated to the remainder of the slot may be determined based on quality of service requirements received with each data transaction, the pending data transactions being ordered having regard to those quality of service requirements in order that the quality of service requirements may best be met. Being able to reallocate a slot enables more efficient use of interconnect resources and enables high quality of service requests to be serviced earlier than may otherwise have occurred.

In one embodiment, the step c) comprises determining that prevention of data transmission with a slave is not required and reallocating any remainder of that slot for transmission of data between one of the plurality of master units and any of the plurality of slave units based on the pending transmission requests.

Hence, should a slot have been allocated so that no data transmission occurs to ensure that a slave or a number of slaves are not requested to respond to a data transmission then any remaining period of that slot may be reallocated to service pending transmission requests. In this way it will be appreciated that should the predicted need to prevent transmission no longer be required then the interconnect may be used.

In one embodiment, the prevention of data transmission with a slave occurs to enable that slave unit to perform an operation and the determining that prevention of data transmission with a slave is not required is based on an indication provided by that slave that the operation has been completed.

Hence, one or more slaves may provide an indication when the prevention of transmission of data is no longer required to enable the slot to be reallocated.

In one embodiment, each slot comprises a plurality of cycles, each cycle supporting transmission of a data value between a master unit and a slave unit.

In one embodiment, the method further comprises splitting pending transmission requests into a plurality transmission sub-request to enable each transmission sub-request to be transmitted within an allocated slot:

Hence, should a slot or a reallocation of a slot be insufficient to support an entire transmission request then the transmission request may be split into one or more transmission sub-requests in order to allow the data transmission to occur in different slots. It will be appreciated that this is particularly useful for interconnect protocols which do not allow burst transmission requests to be broken.

According to a fourth aspect of the present invention, there is provided an apparatus for assigning data for transmission in slots of a transmission frame, the transmission frame comprising a plurality of the slots, each of the plurality of slots being utilisable for the transmission of data in a system-on-a-chip over an interconnect coupling a plurality of master units with a plurality of slave units in response to transmission requests, each slot being designated as belonging to one of a number of different groups of slots, each group of slots allocating a different use of that slot, the apparatus comprising: determining logic operable to determine to which group each slot belongs; slot allocation logic operable, in the event that the determining logic determines that the slot belongs to a group of slots designated as being allocated to a predetermined one of the plurality of master units and the plurality of slave units and being reallocatable to one of the plurality of master units, to allocate the slot to the predetermined one of the plurality of master units and the plurality of slave units; slot reallocation logic operable to determine whether the slot is no longer required by the predetermined one of the plurality of master units and the plurality of slave units and, if so, to reallocate the slot to one of the plurality of master units.

According to a fifth aspect of the present invention there is provided a method of designating slots of a transmission frame, the transmission frame comprising a plurality of the slots, each of the plurality of slots being utilisable for the transmission of data in a system-on-a-chip over an interconnect coupling a plurality of master units with a plurality of slave units, the method comprising the steps of: providing a first arrangement of slots in each transmission frame; providing a second arrangement of slots in each transmission frame; and selecting between the first arrangement and the second arrangement.

Hence, a frame comprising a first predetermined arrangement of slots in a frame may be provided, together with a second predetermined arrangement of slots in a frame. These predetermined arrangements may then be selected between as required. In this way, the most efficient arrangement of slots may be selected when required, thereby improving the efficiency of the interconnect.

In embodiments, at least one slot in at least one of the first arrangement of slots and the second arrangement of slots comprises a first type of slot, each slot of the first type of slot being allocated for use by a predetermined master unit for data transmission with any of the plurality of slave units, the allocation of predetermined master units of the first arrangement of slots differing from the allocation of predetermined master units of the second arrangement of slots.

Hence, one of the arrangements may comprise one or more slots allocated for use by predetermined master units. Accordingly, should it transpire that regular data transmission by that or those master units will be required, the frame including the first type of slots most likely to support that pattern of data transmission may be selected, thereby improving the efficiency of the interconnect.

In embodiments, at least one slot in at least one of the first arrangement of slots and the second arrangement of slots comprises a second type of slot, each slot of the second type of slot being allocated for use by any master unit for data transmission with any of the plurality of slave units, the first arrangement of slots differing from the second arrangement of slots.

Hence, at least one of the arrangements may comprise one or more slots allocated for use by any master unit. Accordingly, should it transpire that irregular data transmission by master units will be required, the frame including the second type of slots most likely to support that pattern of data transmission may be selected, thereby improving the efficiency of the interconnect.

In embodiments, at least one slot in at least one of the first arrangement of slots and the second arrangement of slots comprises a third type of slot, each slot of the third type of slot being allocated to a predetermined one of the plurality of master units and the plurality of slave units and being reallocatable to one of the plurality of master units, the first arrangement of slots differing from the second arrangement of slots.

Hence, at least one of the arrangements may comprise one or more slots allocated for use by a unit. Accordingly, should it transpire that the allocation of the interconnect is required for a particular unit, but that that unit may not require use of the interconnect for all of the slot, the frame including the third type of slots most likely to support that pattern of data transmission may be selected, thereby improving the efficiency of the interconnect.

In embodiments, at least one slot in at least one of the first arrangement of slots and the second arrangement of slots comprises a first type of slot, each slot of the first type of slot being allocated for use by a predetermined master unit for data transmission with any of the plurality of slave units, at least one slot in at least one of the first arrangement of slots and the second arrangement of slots comprises a second type of slot, each slot of the second type of slot being allocated for use by any master unit for data transmission with any of the plurality of slave units and at least one slot in at least one of the first arrangement of slots and the second arrangement of slots comprises a third type of slot, each slot of the third type of slot being allocated to a predetermined one of the plurality of master units and the plurality of slave units and being reallocatable to one of the plurality of master units, the first arrangement of slots differing from the second arrangement of slots.

Hence, each frame may comprise any arrangement of slots from the first, second and third types of slots.

In embodiments, the first arrangement of slots supports transmission of data when operating under a first condition and the step c) comprises selecting the first arrangement on the occurrence of the first condition.

In embodiments, the second arrangement of slots supports transmission of data to occur when operating in a second condition and the step c) comprises selecting the second arrangement on the occurrence of the second condition.

Hence, the arrangements may be selected which best match the current operating conditions. For example, consider the situation where five master units are provided. Under one operating condition, a first combination of master units will routinely transmit data, whereas under another operating condition another combination of master units will routinely transmit data. In this situation two arrangements of slots are provided, the first providing for efficient handling of data transmission requests from the first combination of master units with the second providing for efficient handling of data transmission requests from the second combination of master units. The selection of the two arrangements can then be made to match the operating condition at that time.

In embodiments, the second condition comprises one of a task switch, an interrupt, an error condition, a debug request, a change in energy management settings, a change in clock frequency and a change in operating voltage.

Hence, arrangements may be provided which provide for efficient use of the interconnect under any of those conditions, the particular arrangement being selected to match the condition.

In embodiments, the method further comprises: providing further arrangements of slots in the transmission frame, and wherein the step c) comprises selecting between the first arrangement, the second arrangement and the further arrangements of slots.

According to a sixth aspect of the present invention there is provided an apparatus for designating slots of a transmission frame, the transmission frame comprising a plurality of the slots, each of the plurality of slots being utilisable for the transmission of data in a system-on-a-chip over an interconnect coupling a plurality of master units with a plurality of slave units, the apparatus comprising: logic operable to providing a first arrangement of slots in the transmission frame; logic operable to provide a second arrangement of slots in the transmission frame; and selection logic operable to select between the first arrangement and the second arrangement.

The above, and other objects, and features and advantages of this invention will be apparent from the following detailed description of illustrative embodiments which is to be read in conjunction with the accompanying drawings.

DESCRIPTION OF THE EMBODIMENTS

Figure 1:
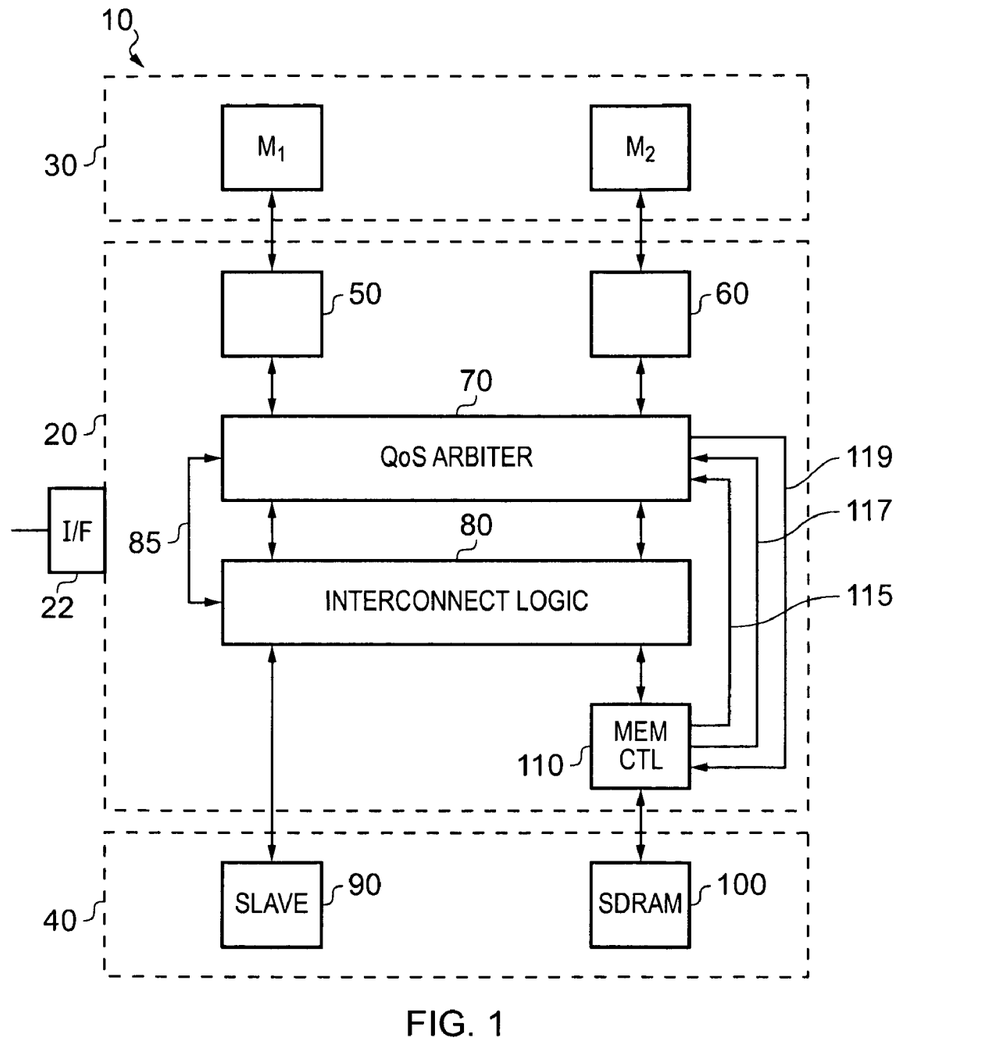
FIG. 1 illustrates a data processing system incorporating an interconnect according to an embodiment of the present invention.

FIG. 1 illustrates a data processing apparatus, generally 10, incorporating an interconnect 20 according to an embodiment of the present invention. The interconnect 20 couples a plurality of master units, generally 30, with a plurality of slave units, generally 40. In this example, a first master unit $M_1$ and a second master unit $M_2$ are provided. However, it will be appreciated that more than two master units and/or more than two slave units may be provided.

The interconnect 20 comprises a number of ports 50, 60, a quality of service arbiter 70, interconnect logic 80 and a memory controller 110. The interconnect 20 is also provided with an interface 22 for communicating information, such as control and configuration information, with the interconnect 20. Each port 50, 60 is coupled with the quality of service arbiter 70. The quality of service arbiter 70 is in turn coupled with the interconnect logic 80. The interconnect logic 80 is coupled directly with a slave 90 and via the memory controller 110 with an off-chip SDRAM 100. The path 85 coupling the interconnect logic 80 with the quality of service arbiter 70 provides information to the quality of service arbiter 70 regarding the current state or configuration of the interconnect logic 80. The path 115 coupling the memory controller 110 with the quality of service arbiter 70 provides information to the quality of service arbiter 70 regarding the current state or configuration of the memory controller 110. The path 119 coupling the memory controller 110 with the quality of service arbiter 70 provides the memory controller 110 with a signal HK_req providing an indication that it has been assigned a transmission slot within which it can perform housekeeping activities, such as performing a refresh of the SDRAM 100. The path 117 coupling the memory controller 110 with the quality of service arbiter 70 provides a signal HK_ack to the quality of service arbiter 70 indicating when the housekeeping operations of the memory controller 110 have completed, thereby enabling the quality of service arbiter 70 to reallocate the transmission slot, if required, for another data transmission within the period allocated to the memory controller 100 to perform its housekeeping operation, as will be explained in more detail below.

In this example, the quality of service arbiter 70 is centralised and is particularly suited to arrangements where all the master units $M_1$, $M_2$ run in the same clock domain. All data transactions from the master units $M_1$, $M_2$ are first routed to the quality of service arbiter 70 which then forwards them in an appropriate order to the interconnect logic 80. Each master unit $M_1$, $M_2$ specifies a quality of service requirement. This quality of service requirement may indicate the maximum latency period which is acceptable to that master from the time that a data transaction request is issued to the time that the data associated with that transaction is available or could include other aspects of data processing apparatus performance, such as the provision of a channel of predetermined bandwidth (such as a minimum or maximum data bandwidth) between a given master unit and a given slave unit. Whilst in this example each master unit $M_1$, $M_2$ is provided with a corresponding constant predetermined quality of service requirement associated with that master unit, it will be appreciated that each data transaction itself could be provided with an indication of a quality of service requirement associated therewith.

Also, whilst individual master units are shown, it will be appreciated that each of these master units may not necessarily only represent a single physical master unit but, instead, one or more master units may be a virtual master. Each virtual master is a grouping of transactions which emanate from one physical master unit but can be identified as belonging to a distinct virtual group of transactions.

In this example, where the quality of service requirement is predetermined for each master, the requirements are stored within the quality of service arbiter 70. Typically, this stored configuration would be programmed by a controlling master during an initial set up or bootstrap phase before normal operation commences. During normal operation the requirements would then be stored statically within the quality of service arbiter 70. In the case that data transactions themselves provide a quality of service requirement then these requirements will be provided dynamically from the master units to the quality of service arbiter 70 along with the transactions themselves. In the case of virtual masters the quality of service arbiter 70 can statically store quality of service requirements for multiple virtual masters corresponding to a single physical master.

Access to the interconnect logic 80 is controlled using time division techniques timed with reference to a clock signal. In each clock cycle a predetermined data value such as, for example, 32 bits of data may be transferred over the interconnect logic 80. However, allocating individual clock cycles for data transmission can be complex and can require a large amount of resources to track and control such allocation. Accordingly, a predetermined number of consecutive clock cycles are allocated as a transmission slot. A number of these transmission slots form a transmission frame. The transmission frame may then be repeated.

For example, if each clock cycle is able to support the transfer 32 bits of data, then a transmission slot operable to transmit 4 Kb (bits) of data would comprise 128 clock cycles. Based on characteristics of the data processing apparatus and based on the quality of service requirements of units of the data processing apparatus, a suitable transmission slot size can be determined for any particular situation. A number of consecutive transmission slots form a transmission frame. For example, a transmission frame operable to transmit 128 Kb (bits) of data would comprise 32 transmission slots. The transmission frame may then be repeated.

A number of different types of transmission slots are provided, each having particular characteristics which are useful in different situations. Each transmission slot within the transmission frame is allocated as belonging to one of those number of different types of slots. The combination of transmission slots in a transmission frame is determined based on the on characteristics of the data processing apparatus 10 and based on the quality of service requirements of units of the data processing apparatus 10. More than one transmission frame arrangement of slots may be provided to suit different operating conditions, as will be described in more detail below.

In a guaranteed throughput (GT) transmission slot, the entire transmission slot is allocated to one particular master unit to enable that master unit to transmit data. Hence, whenever such a transmission slot occurs, the allocated master unit is guaranteed to be able to transmit data.

In a best effort (BE) transmission slot, any master unit may transmit data and, typically, a master unit with the most urgent pending request will be allocated that transmission slot to transmit its data as determined by the quality of service arbiter 70. Hence, whenever such a transmission slot occurs, any particularly urgent data will be transmitted.

In a latency (L) transmission slot, one particular master unit or slave unit will be allocated to use that transmission slot, but the transmission slot may be reallocated to another master unit in the event that the allocated unit does not require to use that transmission slot. This type of transmission slot is particularly useful where a particular master unit routinely requires to transmit data over the interconnect logic 80 but the amount of data which is required to be transmitted is typically less than that supported by the transmission slot. Accordingly, the master unit is guaranteed to have access to that transmission slot but any remainder time of that transmission slot does not result in the interconnect logic 80 being dormant but instead enables the interconnect logic 80 to transmit data from another master unit. Similarly, such a transmission slot enables a slave unit ensure that no data is transmitted to that slave unit so that it can perform housekeeping activities but, once those housekeeping activities have completed or in the event that the slave unit does not require to perform any housekeeping at that time, the transmission slot can be reallocated for use by a master unit. It will be appreciated that this is particularly useful where slave units routinely have to perform housekeeping activities during which they are unable to communicate and enables these housekeeping activities to be scheduled in a predictable manner. This helps to ensure that overall quality of service requirements continue to be met. Also, the utilisation of the interconnect logic 80 can be increased which improves throughput and use efficiency.

Figure 2:
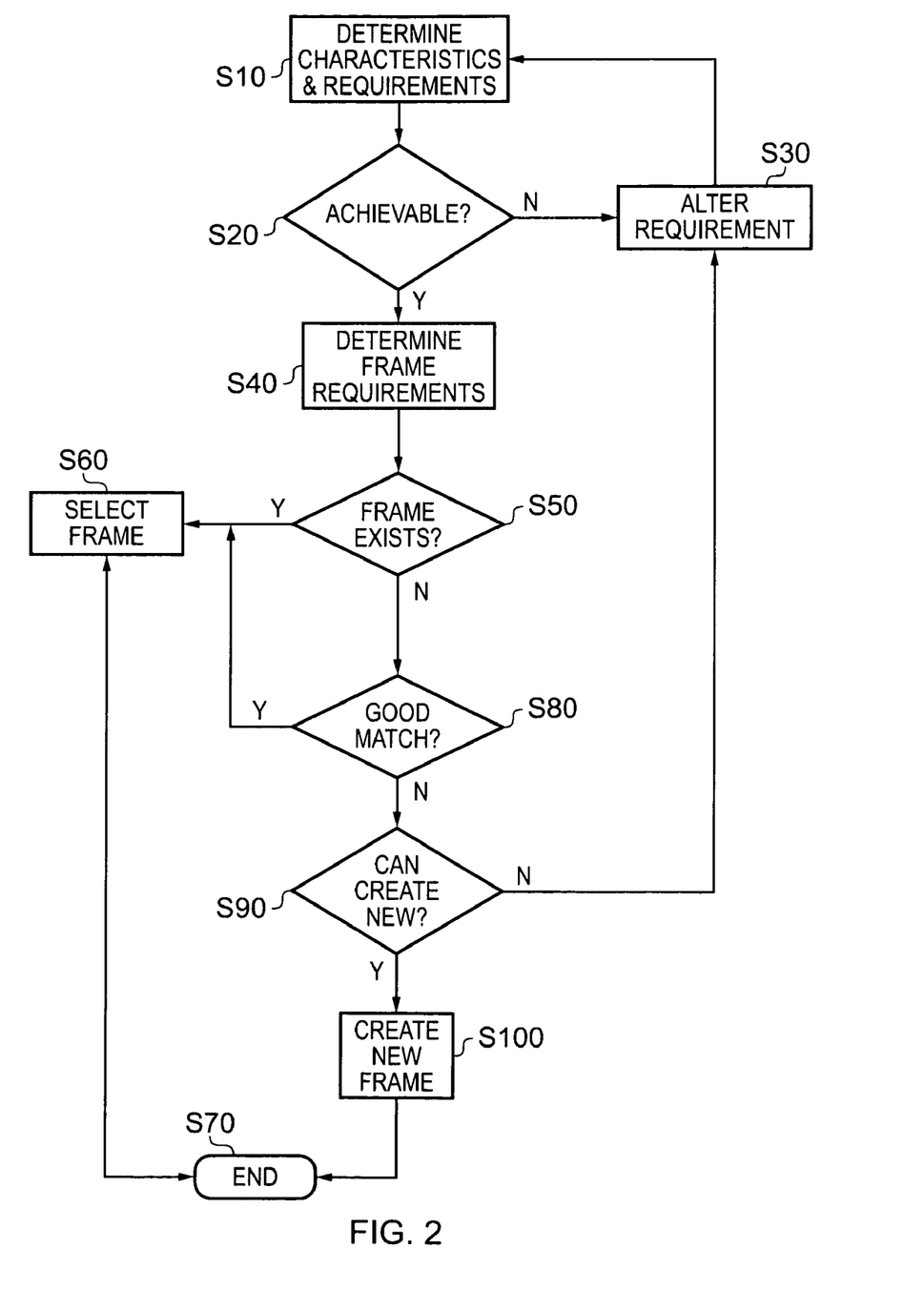
FIG. 2 is a flow diagram illustrating the method of determining slot allocation arrangements.

FIG. 2 illustrates a method for determining transmission slot arrangements of transmission frames. Typically, this method is performed during the design of the data processing apparatus 10 when validating that design against the operating requirements specified for the data processing apparatus 10. However, it will be appreciated that the data processing apparatus 10 itself can execute such a method either at boot-up or even dynamically in response to changes in hardware characteristics or quality of service requirements.

It will be appreciated that in simple systems, it may be possible to perform the method illustrated in a single pass for the complete range of requirements and characteristics. However, in more complex systems, selected portions of these requirements and characteristics may need to be evaluated and so multiple executions of the method may be required in order to generate different frame arrangements for different requirements.

At step S10, the characteristics of the data processing apparatus 10 together with the operating requirements of the data processing apparatus 10, including any quality of service requirements, are determined.

At step S20, it is determined, typically using mathematical modelling, whether those requirements are achievable by data processing apparatus 10 having the specified characteristics.

At step S30, if those requirements are not achievable with hardware having those characteristics, then the requirements will be altered. Processing then returns to step S10.

If it is determined that the requirements are achievable, then at step S40, the frame requirements are determined. In particular, the types and arrangements of slots to enable those operating requirements to be met are determined. Once the frame requirements have been determined then processing proceeds to step S50.

At step S50, a determination is made as to whether such a frame already exists (i.e. a frame having this arrangement has already been created). If such a frame does already exist then processing proceeds to step S60 where that frame is selected. Thereafter processing completes at step S70.

In the event that no such frame already exists then processing proceeds to step S80 where it is determined whether an adequately matching frame already exists.

If such an adequate frame does already exist, then processing proceeds to step S60 where that adequately matching frame is selected and then processing completes at step S70.

In the event that an adequately matching frame does not exist then processing proceeds to step S90 where it is determined whether a further frame may be created. Up to a predetermined number of frame arrangements may be provided. Once that predetermined number has been exceeded then no further frame arrangements may be created. Where the frame arrangements are stored in, for example, hardware registers in the data processing apparatus 10 then the number of frame arrangements may be limited to, for example, two, either of which may be selected. However, where the frame arrangements are stored in memory and then loaded into registers within the data processing apparatus 10 then the number of frame arrangements which may be stored for later selection from can be significantly higher.

In the event that it is not possible to create a new frame arrangement then processing proceeds to step S30 where the requirements are altered.

In the event that it is possible to create a new frame then processing proceeds to step S100 where the new frame is created and thereafter processing completes at step S70.

As mentioned above, one or more frame arrangements may be provided. In the event that only one frame arrangement is provided then it will be appreciated that the operating requirements of the data processing apparatus may be limited. However, by providing more frame arrangements, the range of operating requirements that may be supported by the data processing apparatus 10 can be significantly increased. It will also be appreciated therefore that the processing steps from step S40 to step S100 may be repeated many times, each relating to different operating conditions in order to generate transmission frame arrangements suitable for those operating conditions. For example, one set of transmission frame arrangements may be provided for when the data processing apparatus 10 is operating in one of a number of normal operating modes, whereas a number of alternative transmission frame arrangements may be provided for when operating in one of a number of exception or interrupt modes. Similarly, alternative transmission frame arrangements may be provided for when the operation or configuration of the data processing apparatus 10 changes. Each of these frames will be determined by following the processing steps from steps S40 to S100 for that particular condition.

Figure 3:
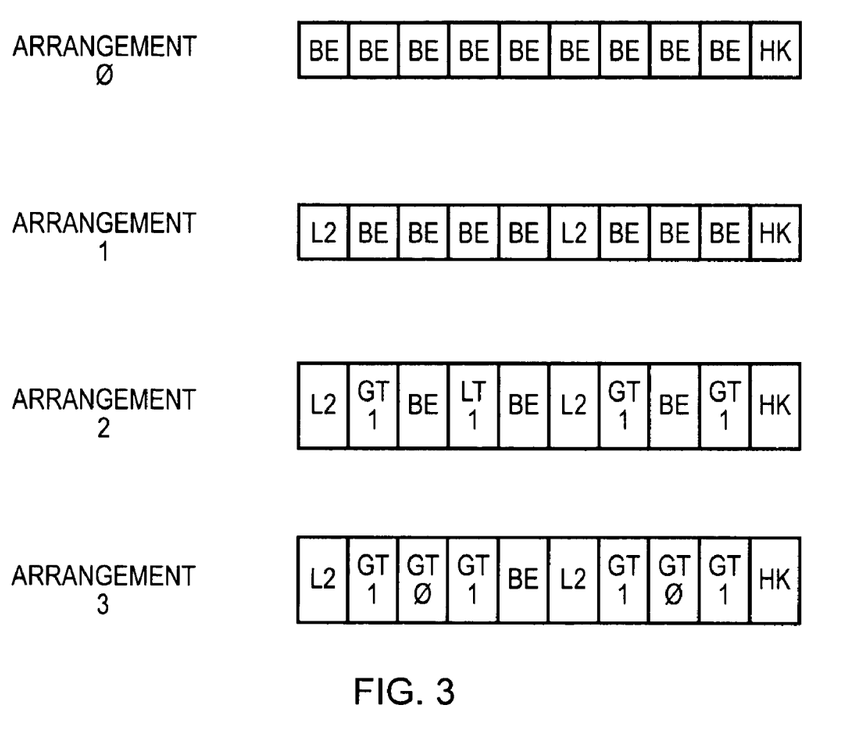
FIG. 3 illustrates example arrangements of slots of a transmission frame used to control access to the interconnect of FIG. 1.

FIG. 3 illustrates in more detail example frame arrangements used by the data processing apparatus 10 shown in FIG. 1. In this example arrangement, the master $M_1$ is a processor (ID 0), the master $M_2$ is video device (ID1) and a further master (not shown) is an audio device (ID 2). These masters are connected to the interconnect 20. The interconnect 20 is connected to the SDRAM slave device 100, which must be periodically refreshed.

Each component has specific requirements. The video device, when enabled, requires 40% of the interconnect 20 bandwidth. The audio device, when enabled, must perform a transfer every half transmission frame; however, only a single burst transfer need be performed. The SDRAM controller 110 must perform a refresh every transmission frame. The processor can soak up any left over bandwidth, unless there is an error, whereupon 20% of the bandwidth must be provided to the processor.

Arrangement 0 shows the transmission frame arrangement when the audio, and video devices are disabled. There are 9 best effort (BE) transmission slots which allow the available bandwidth to be shared between the masters, as necessary. There is a single house keeping (HK) transmission slot which is used to allow the SDRAM device 100 to be refreshed.

Arrangement 1 shows the transmission frame arrangement when the audio device is enabled and the video device is disabled. Compared with arrangement 0, two of the best effort (BE) transmission slots have been altered to latency (L2) transmission slots for the audio device. The latency transmission slots are positioned to ensure that the audio device is able to perform a transfer every half transmission frame.

Arrangement 2 shows the transmission frame arrangement when the audio and video devices are enabled. Compared with arrangement 1, four of the best effort (BE) transmission slots have been altered to guaranteed throughput (GT1) slots for the video device. These transmission slots ensure that the video device obtains 40% of the bandwidth.

Arrangement 3 shows the transmission frame arrangement when the audio and video devices are enabled and there is an error which the processor must service. Compared with arrangement 2, two of the best effort (BE) transmission slots have been altered to provide guaranteed throughput (GT0) transmission slots for the processor. These transmission slots provide the processor with 20% of the bandwidth.

Figure 4:
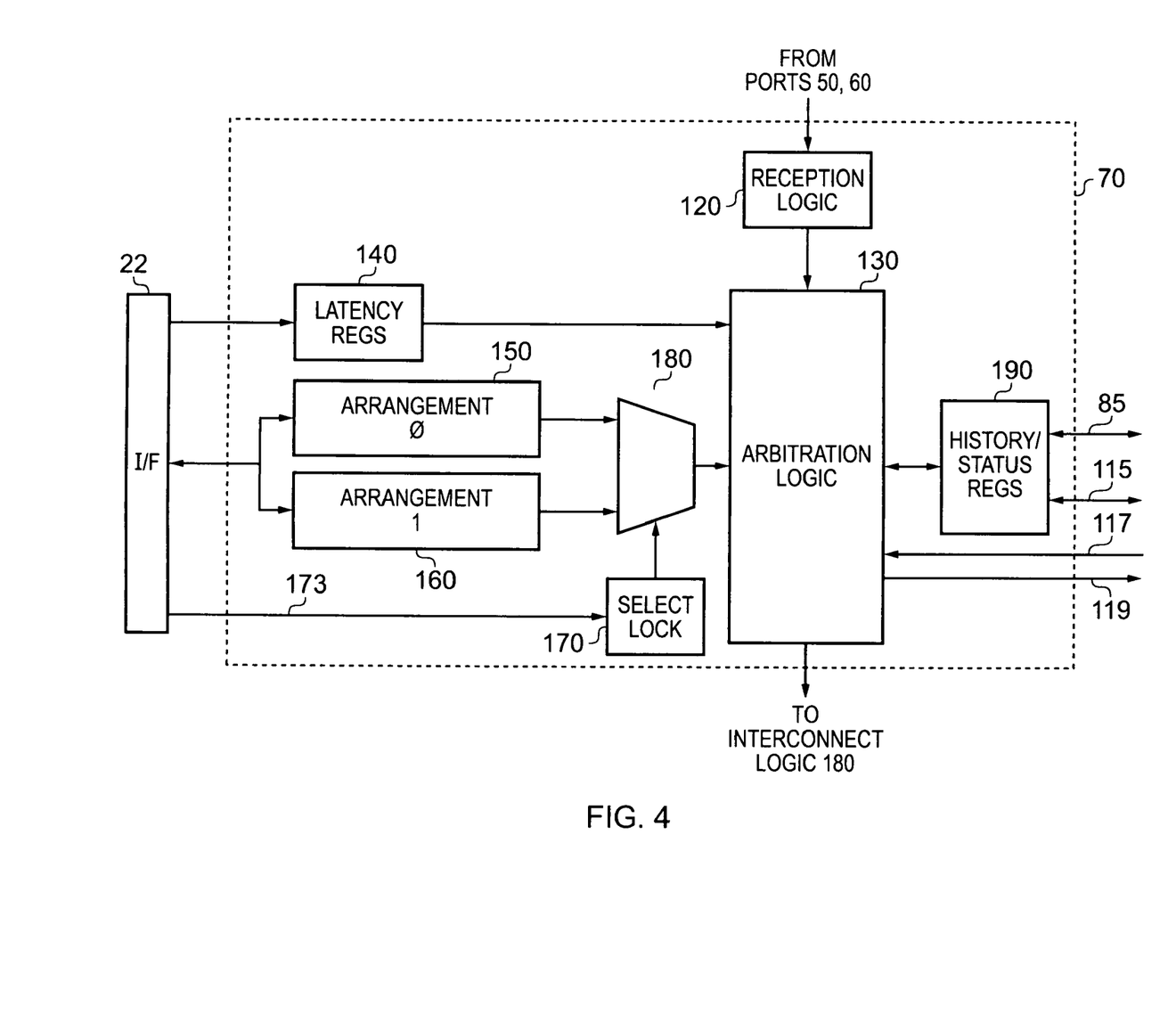
FIG. 4 illustrates an arrangement of the quality of service arbiter illustrated in FIG. 1.

FIG. 4 illustrates the quality of service arbiter 70 in more detail. Each data transmission request provided by the master units $M_1$, $M_2$ is received at its associated port 50, 60 and forwarded onto the quality of service arbiter 70. The reception logic 120 receives the data transmission requests. These data transmission requests are stored in a pending transaction queue (not shown) within the arbitration logic 130. The arbitration logic 130 is used to arbitrate between master units.

The characteristics of the interconnect logic 80 are stored in latency register 140. These characteristics include such factors as whether it may issue only one or multiple data transactions in each cycle, or whether it may take one cycle or multiple cycles to transfer data to a destination slave unit. The characteristics of the interconnect logic 80 are dependent on the routing mechanisms employed by the interconnect logic 80 and the routing topologies implemented between routing mechanisms.

The characteristics of the slave units are also stored in the latency register 140. In this example, the latency register 140 indicates that the slave unit 90 has a constant latency period for all data transactions. However, the latency register 140 indicates that the SDRAM 100 has a latency period which will very dependent on the status of that SDRAM 100 and the address region used by a particular data transaction.

Frame arrangement registers 150, 160 store slot allocations for two frame arrangements. These frame arrangement registers 150, 160 may have the frame arrangements stored therein either during bootup or they may be dynamically altered in response to changing operating conditions of the data processing apparatus 10. Frame arrangement select logic 170 is provided which is responsive to a condition signal provided over the path 173 to cause one of frame arrangement 0 and frame arrangement 1 to be provided to the arbitration logic 130. The condition signal provided to the frame select logic 170 indicates a particular operating state of the data processing apparatus 10. For example, as mentioned above, the frame arrangement register 150 may store an arrangement of slots suitable for operating the interconnect in a first mode of operation such as, for example, a normal mode of operation. When operating in the normal mode, the condition signal provided over the path 173 causes the select logic 170 to select the frame arrangement 0 from the frame arrangement register 150. However, in the event that a particular predetermined condition such as, for example, an interrupt or exception occurs then the condition signal provided over the path 173 causes the select logic to provide the frame arrangement 1 to the arbitration logic. In this way, it can be seen that the frame arrangement can be changed to suit the changing conditions of the data processing apparatus 10.

The memory controller 110 and interconnect are interrogated by the quality of service arbiter 70 in order to determine the current state of the SDRAM 100 and the memory controller 110. The interconnect logic 80 is interrogated by the quality of service arbiter 70 to determine its current state and the current state of any data transfers. This information is then stored by a history and status register 190. The arbitration logic 130 maintains a model (not shown) of SDRAM behaviour which allows it to predict SDRAM 100 access latency given the record of outstanding transactions, and the configuration and current state of the memory controller 110.

The arbitration logic 130 utilises a set of dependency rules (not shown) which allow it to predict interconnect latency given the address range of a data transmission request, the record of outstanding data transmission requests, the current state of the interconnect and the predicated slave unit latency.

Once initiated, the arbitration logic 130 will determine the frame arrangement provided from one of the frame arrangement registers 150, 160. As mentioned, the transmission frame arrangement provided will depend on the current operating conditions of the data processing apparatus 10. The arbitration logic 130 will start to receive data transmission requests from the reception logic 120. These data transmission requests will be stored in the pending transaction queue until a suitable transmission slot becomes available within the transmission frame. Once a transmission slot becomes available then a pending data transmission request will be serviced, as will be explained in more detail below with reference to FIG. 5. During operation, the arbitration logic 130 will routinely interrogate the latency registers 140 and the history and status registers 190, as appropriate. Once a pending data transmission request is serviced, the data transmission request is sent to the interconnect logic 180.

Figure 5A:
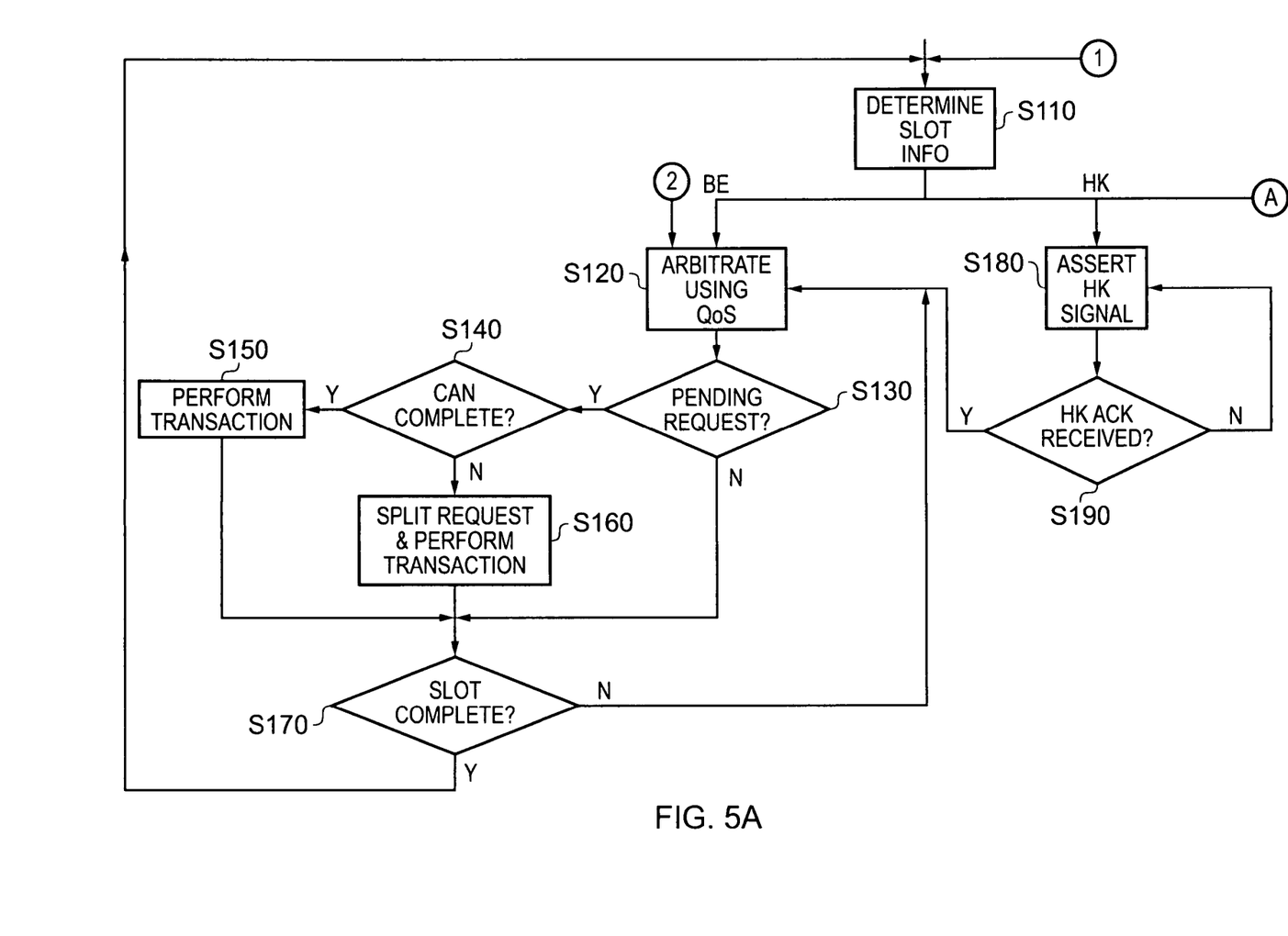
FIGS. 5A to 5C are a flow diagram illustrating the operation of the quality of service arbiter shown in FIG. 4.
Figure 5B:
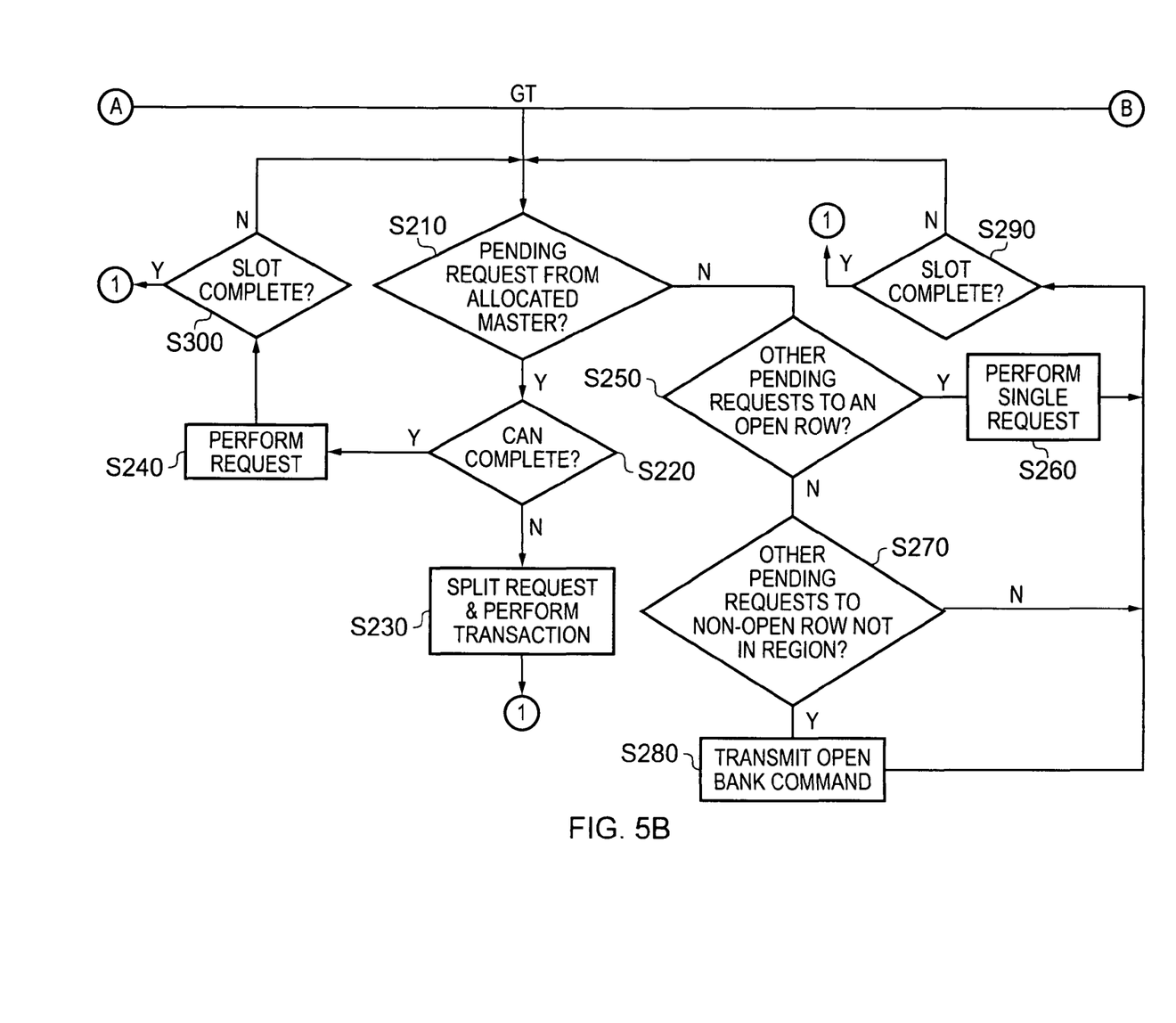
Figure 5C:
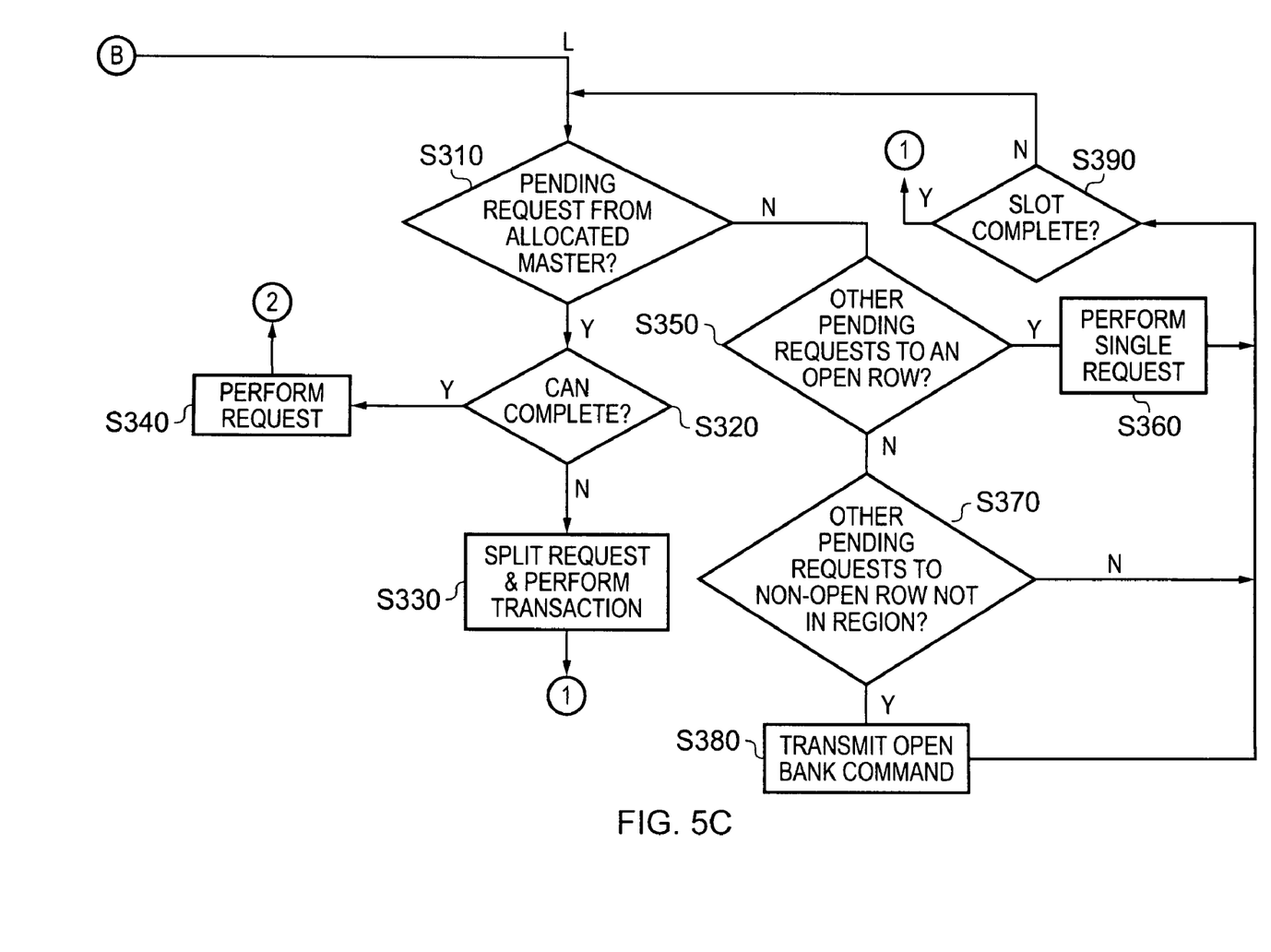

FIGS. 5A to 5C illustrates in more detail the operation of the quality of service arbitrator 70 when servicing data transmission requests.

At step S110, the arbitration logic 130 determines the allocation of the current transmission slot in the transmission frame. The result of this determination will be that the slot comprises one of a BE transmission slot, a HK transmission slot, a GT transmission slot and an L transmission slot.

In the event that the transmission slot comprises a BE transmission slot, indicating that no particular master or slave unit has been allocated that transmission slot, then the pending data transmission request will be arbitrated between using quality of service requirements.

Accordingly, at step S120, any pending requests are ordered in accordance with a quality of service arbitration scheme. In particular, the quality of service arbiter 70 will determine which slave unit each data transmission request is intended for. The quality of service arbiter 70 will review the current status of the interconnect logic 80 and will consider how the interconnect logic 80 is able to respond to the received request and any other pending requests in view of its current configuration. The quality of service arbiter 70 will also review the ability of the destination slave unit to respond to the data transaction. By reviewing both current status of the interconnect and its associated quality of service level, together with the ability of the destination slave unit to respond to the data transaction and its associated quality of service level, it becomes possible to judge the effect that a chosen transaction ordering has on the quality of service level that would be provided for the transactions by the combination of the interconnect logic and the slave units thereby enabling a judgement to be made of which transaction ordering would allow all stated quality of service requirements to be met. The quality of service arbiter 70 will then reorder the pending data transmission requests in order to meet the quality of service requirements. Typically, the quality of service arbiter 70 will continually perform such an analysis and reordering as each data transmission request is received and serviced in order that the data transmission request a the front of the queue may simply be selected when a BE transmission slot becomes available. Processing then proceeds to step S130.

At step S130, a determination is made as to whether there is a pending request. In the event that there is a pending request then the processing proceeds to step S140. In the event that there is no pending request then processing proceeds to step S170.

At step S140, a determination is made as to whether the pending request identified by the quality of service arbitration scheme can complete within the current transmission slot.

In the event that the data transmission can occur within the current slot then processing proceeds to step S150 where the data transmission occurs, processing then proceeds to step S170.

In the event that the data transmission request cannot be completed within the current slot then processing proceeds to step S160 where the data transmission request is spilt into a number of data transmission sub-requests and a data transmission sub-request is performed, thereafter processing proceeds to step S170.

At step S170, a determination is made as to whether the current transmission slot has completed.

In the event that the current transmission slot has not completed then the processing returns to step S120 where any pending data transmission requests are arbitrated once more.

In the event that the current slot has completed then the processing returns to step S110.

This completes the processing steps for a BE transmission slot.

In the event that it is determined at step S110 that the current slot is a HK slot, indicating that this slot has been allocated to enable one or more slaves to perform housekeeping functions, processing proceeds to step S180.

At step S180, the arbitration logic 130 asserts the HK_req signal over the path 119 to the memory controller 110. In the event that the memory controller 110 does not wish to perform a housekeeping function the memory controller 110 will immediately assert the HK_ack signal over the path 117. In the event that the memory controller 110 does wish to perform a housekeeping function the memory controller 110 will not assert the HK_ack signal over the path 117 until the housekeeping function has completed.

At step S190, a determination is made as to whether a HK_ack signal has been asserted over the path 117 and that the interconnect 80 may be used to transmit data during the current transmission slot. In the event that HK_ack has not been asserted then processing proceeds back to step S180.

In the event that a HK_ack signal is received at step S190 then processing proceeds to step S120 whereby the remainder of the transmission slot is arbitrated using the quality of service scheme in order to allocate the remainder of that transmission slot to another master unit.

This completes the processing steps for a HK transmission slot.

If at step S110 it is determined that the transmission slot is a GT transmission slot then processing proceeds to step S210.

At step S210, it is determined whether there is a pending request from the master unit allocated for that transmission slot.

In the event that there is a pending request from the allocated master unit then the processing proceeds to step S220.

At step S220, a determination is made as to whether the pending request for that master unit can complete in the available transmission slot. In the event that the pending request cannot complete within the available transmission slot then processing proceeds to step S230.

At step S230, the request is spilt into a number of data transmission sub-requests and a data transmission sub-request is performed. Thereafter, processing returns to step S110.

In the event that it is determined at step S220 that the pending transaction can complete then processing proceeds to step S240.

At step S240, the data transmission request is performed and processing proceeds to step S300.

At step S300, a determination is made as to whether the current transmission slot has completed.

In the event that the current transmission slot has not completed then the processing returns to step S210.

In the event that the current slot has completed then the processing returns to step S110.

In the event that it is determined at step S210 that there is no pending request from the master allocated that transmission slot then processing proceeds to step S250.

At step S250, a determination is made as to whether there are any other pending requests to an open row in memory. This determination is made by referring to the history and status registers 190 which track the current status of the SDRAM 100 as indicated by the memory controller 110. In the event that it is determined that there are such pending requests then processing proceeds to step S260.

At step S260, a single data transfer is performed within a single clock cycle of that transmission slot. Thereafter, processing proceeds to step S290.

At step S290, a determination is made as to whether the current transmission slot has completed.

In the event that the current transmission slot has not completed then the processing returns to step S210.

In the event that the current slot has completed then the processing returns to step S110.

In the event that it is determined at step S250 that there are no pending requests to an open row then processing proceeds to step S270.

At step S270, a determination is made as to whether there are any other pending requests which are to a non-open row, but which are also not within a memory region being accessed by the currently allocated master unit. This information is provided by the history and status registers 190.

In the event that there are pending requests but these are to a non-open row in a memory region being accessed by the master unit then it is not desirable to perform these transactions since they may interfere with the efficiency of the data transactions being performed by the allocated master unit. Accordingly, processing proceeds to step S290.

In the event that there are pending transactions to a non-open row, but those rows are not within the memory region of the currently allocated master unit then it is safe to open these rows without impacting on the efficiency of the data transmissions being performed by the master unit and so processing proceeds to step S280.

At step S280, an open bank command is transmitted. Thereafter, processing returns to step S290.

This completes the processing steps for an GT transmission slot.

If at step S110 it is determined that the transmission slot is an L transmission slot then processing proceeds to step S310.

At step S310, it is determined whether there is a pending request from the master unit allocated for that transmission slot.

In the event that there is a pending request from the allocated master unit then the processing proceeds to step S320.

At step S320, a determination is made as to whether the pending request for that master unit can complete in the available transmission slot. In the event that the pending request cannot complete within the available transmission slot then processing proceeds to step S330.

At step S330, the request is spilt into a number of data transmission sub-requests and a data transmission sub-request is performed. Thereafter, processing returns to step S110.

In the event that it is determined at step S320 that the pending transaction can complete then processing proceeds to step S340.

At step S340, the data transmission request is performed and processing proceeds to step S210.

In the event that it is determined at step S310 that there is no pending request from the master allocated that transmission slot then processing proceeds to step S350.

At step S350, a determination is made as to whether there are any other pending requests to an open row in memory. This determination is made by referring to the history and status registers 190 which track the current status of the SDRAM 100 as indicated by the memory controller 110. In the event that it is determined that there are such pending requests then processing proceeds to step S360.

At step S360, a single data transfer is performed within a single clock cycle of that transmission slot. Thereafter, processing proceeds to step S390.

At step S390, a determination is made as to whether the current transmission slot has completed.

In the event that the current transmission slot has not completed then the processing returns to step S310.

In the event that the current slot has completed then the processing returns to step S110.

In the event that it is determined at step S350 that there are no pending requests to an open row then processing proceeds to step S370.

At step S370, a determination is made as to whether there are any other pending requests which are to a non-open row, but which are also not within a memory region being accessed by the currently allocated master unit. This information is provided by the history and status registers 190.

In the event that there are pending requests but these are to a non-open row in a memory region being accessed by the master unit then it is not desirable to perform these transactions since they may interfere with the efficiency of the data transactions being performed by the allocated master unit. Accordingly, processing proceeds to step S390.

In the event that there are pending transactions to a non-open row, but those rows are not within the memory region of the currently allocated master unit then it is safe to open these rows without impacting on the efficiency of the data transmissions being performed by the master unit and so processing proceeds to step S380.

At step S380, an open bank command is transmitted. Thereafter, processing returns to step S390.

This completes the processing steps for an L transmission slot.

Accordingly, techniques for transmitting data efficiently are provided. A transmission frame comprising a first predetermined arrangement of slots in a frame, together with a transmission frame comprising a second predetermined arrangement of slots in a frame are provided. These arrangements are then selected between as required. In this way, the most efficient arrangement of slots may be selected in order to improve the efficiency of data transmission over the interconnect.

Within each transmission frame each slot is allocated as belonging to one of a number of different groups. Slots belonging to the first group are allocated for the use of a designated one of the plurality of master units. Slots belonging to the second group are available to any master unit for data transmission with any of the of slave units. Slots belonging to the third group are available for use by master units or slave units, but these slots are also re-allocatable to other master units for their use. Should a slot of the third group not need to be used by the allocated unit, this slot can then be reassigned for use by another master unit. In this way, more use of the slots can be achieved and the efficiency of data transfers over the interconnect can be improved.

As a slot becomes available for use for transmission of data over the interconnect, a determination is made of whether that slot belongs to a predetermined group which allows for reallocation of the slot for a different use. Should it be determined that the slot is such a slot then the slot is firstly allocated for its intended use and, thereafter, should the slot no longer be required for that use it may be reallocated for another use. A sequence of slots within a frame can therefore be provided which enable particular requirements placed on the interconnect to be achieved, but also enables more efficient use of those slots once the requirement for allocation of that slot has been satisfied.

Although embodiments of the invention have been described in detail herein, with reference to the accompanying drawings, it is understood that the invention is not limited to those precise embodiments, and that various changes and modifications can be effected therein by one skilled in the art without departing from the spirit and the scope of the invention as defined by the appended claims.

I claim:

1. A method of designating slots of a transmission frame for controlling transmission of data over an interconnect coupling a plurality of master units with a plurality of slave units, said transmission frame comprising a plurality of said slots, each of said plurality of slots transmits at least a portion of said data in a system-on-a-chip over said interconnect, said method of designating slots comprising the steps of:

receiving a frame arrangement for said transmission frame, said frame arrangement specifying, for each of at least a subset of slots of said transmission frame, whether the slot is a first type of slot, a second type of slot or a third type of slot so as to define a transmission frame comprising a combination of slots of at least one of said first type, said second type and said third type; and allocating slots of said transmission frame for data transmission based on said frame arrangement, said allocating step comprising:

i) determining, based on said frame arrangement, whether a current slot is of said first type, said second type or said third type;

ii) if said current slot is determined to be of said first type, allocating said current slot to one predetermined master unit for data transmission with any of said plurality of slave units;

iii) if said current slot is determined to be of said second type, allocating said current slot to any master unit for data transmission with any of said plurality of slave units; and iv) if said current slot is determined to be of said third type, allocating said current slot to a predetermined one of said plurality of master units and said plurality of slave units, said slot of said third type being reallocatable to one of said plurality of master units, thereby providing an efficient transmission frame for transmission of data between at least one of said master units and at least one of said slave units.

2. The method of claim 1, wherein each slot of said third group of slots is reallocated to one of said plurality of master units once no longer required by said one of said plurality of master units and said plurality of slave units.

3. The method of claim 1, wherein at least one slot of said third group of slots is allocated for transmission of data between a predetermined one of said master units and any of said plurality of slave units and, once said transmission of data has been completed, any remainder of that slot is reallocated for transmission of data between any of said plurality of master units and any of said plurality of slave units.

4. The method of claim 3, wherein said transmission of data between said predetermined one of said master units and said any of said plurality of slave units comprises a burst transmission of one or more of data values and, once said burst transmission has been completed, any remainder of that slot is reallocated for transmission of data between any of said plurality of master units and any of said plurality of slave units.

5. The method of claim 1, wherein at least one slot said third group of slots is allocated for preventing data transmission with a slave unit to enable that slave unit to perform an operation and, once said operation has been completed, any remainder of that slot is configured to be reallocatable for transmission of data between any of said plurality of master units and any of said plurality of slave units.

6. The method of claim 5, wherein said operation causes said slave unit to be unable to perform data transmission until said operation completes.

7. The method of claim 5, wherein said operation occurs periodically.

8. The method of claim 5, wherein said slave unit comprises a Synchronous Dynamic Random Access Memory (SDRAM) and said operation comprises a refresh operation of data values stored therein.

9. The method of claim 1, wherein at least one slot of said third group of slots is allocated for transmission of data between a predetermined one of said master units and any of said plurality of slave units and, once said transmission of data has been completed, any remainder of that slot is configured to be reallocatable for transmission of data between any of said plurality of master units and any of said plurality of slave units and at least one slot said third group of slots is allocated for preventing data transmission with a slave unit to enable that slave unit to perform an operation and, once said operation has been completed, any remainder of that slot is configured to be reallocatable for transmission of data between any of said plurality of master units and any of said plurality of slave units.

10. The method of claim 1, wherein said third group of slots comprises those slots of said transmission frame which are not designated as said first group of slots or said second group of slots.

11. The method of claim 1, wherein each slot comprises a plurality of cycles, each cycle supporting transmission of a data value between a master unit and a slave unit.

12. The method of claim 1, comprising the steps of:
(a) determining characteristics of said interconnect, said plurality of master units and said plurality of slave units and determining operating requirements of said data transmission over said interconnect coupling said plurality of master units and said plurality of slave units;
(b) determining said frame arrangement based on said interconnect characteristics and said operating requirements; and
(c) determining whether said frame arrangement enables said operating requirements to be met with said interconnect, said plurality of master units and said plurality of slave units having those characteristics, and, if not, re-executing steps (a) to (c) until said requirements are met.

13. A computer program product stored on a non-transitory computer readable storage medium which, when executed on a computer, performs a method of designating slots of a transmission frame for controlling transmission of data over an interconnect coupling a plurality of master units with a plurality of slave units, said transmission frame comprising a plurality of said slots, each of said plurality of slots transmits at least a portion of said data in a system-on-a-chip over said interconnect, said method comprising the steps of:

receiving a frame arrangement for said transmission frame, said frame arrangement specifying, for each of at least a subset of slots of said transmission frame, whether the slot is a first type of slot, a second type of slot or a third type of slot so as to define a transmission frame comprising a combination of slots of at least one of said first type, said second type and said third type; and allocating slots of said transmission frame for data transmission based on said frame arrangement, said allocating step comprising:

i) determining, based on said frame arrangement, whether a current slot is of said first type, said second type or said third type;

ii) if said current slot is determined to be of said first type, allocating said current slot to one predetermined master unit for data transmission with any of said plurality of slave units;

iii) if said current slot is determined to be of said second type, allocating said current slot to any master unit for data transmission with any of said plurality of slave units; and iv) if said current slot is determined to be of said third type, allocating said current slot to a predetermined one of said plurality of master units and said plurality of slave units, said slot of said third type being reallocatable to one of said plurality of master units, thereby providing an efficient transmission frame for the transmission of data between at least one of said master units and at least one of said slave units.

14. The computer program product of claim 13, comprising the steps of:
(a) determining characteristics of said interconnect, said plurality of master units and said plurality of slave units and determining operating requirements of said data transmission over said interconnect coupling said plurality of master units and said plurality of slave units;

(b) determining said frame arrangement based on said interconnect characteristics and said operating requirements; and
(c) determining whether said frame arrangement enables said operating requirements to be met with said interconnect, said plurality of master units and said plurality of slave units having those characteristics, and, if not, re-executing steps (a) to (c) until said requirements are met.

15. An interconnect for coupling a plurality of master units with a plurality of slave units and controlling transmission of data over said interconnect in accordance with a transmission frame comprising a plurality of slots, each of said plurality of slots transmits at least a portion of said data in a system-on-a-chip over said interconnect, said interconnect comprising:

frame arrangement storage configured to store a frame arrangement for said transmission frame, said frame arrangement specifying, for each slot of at least a subset of slots of said transmission frame, whether the slot is a first type of slot, a second type of slot or a third type of slot so as to define a transmission frame comprising a combination of slots of at least one of said first type, said second type and said third type;

arbitration logic configured to receive said frame arrangement from said frame arrangement storage and to allocate the slots of said transmission frame for data transmission based on said frame arrangement;

wherein said arbitration logic is configured to:
(i) determine, based on said frame arrangement, whether a current slot is of said first type, said second type or said third type;
(ii) if said current slot is determined to be of said first type, allocate said current slot to one predetermined master unit for data transmission with any of said plurality of slave units;
(iii) if said current slot is determined to be of said second type, allocate said current slot to any master unit for data transmission with any of said plurality of slave units; and
(iv) if said current slot is determined to be of said third type, allocate said current slot to a predetermined one of said plurality of master units and said plurality of slave units, said slot of said third type being reallocatable to one of said plurality of master units, thereby providing an efficient transmission frame for transmission of data between at least one of said master units and at least one of said slave units.

* * * * *